United States Patent [19]

Kobetsky

[11] 4,163,885

[45] Aug. 7, 1979

[54] INDUCTION HEATING CORE AND HEATING SYSTEM FOR ADHESIVE FASTENERS

[75] Inventor: Robert G. Kobetsky, Chicago, Ill.

[73] Assignee: Illinois Tool Works Inc., Chicago, Ill.

[21] Appl. No.: 837,350

[22] Filed: Sep. 28, 1977

[51] Int. Cl.² .............................................. H05B 5/08
[52] U.S. Cl. ........................... 219/10.49 R; 156/380; 219/10.53; 219/10.79
[58] Field of Search .............. 219/10.49, 10.53, 10.79, 219/9.5, 10.57, 10.73, 10.43, 10.61; 156/380, 273; 336/55, 59, 60

[56] References Cited

U.S. PATENT DOCUMENTS

| | | | |
|---|---|---|---|
| 2,452,197 | 10/1948 | Kennedy | 219/10.79 |
| 2,535,836 | 12/1950 | Cameron et al. | 219/9.5 |
| 2,912,552 | 11/1959 | Baermann | 219/10.79 |
| 3,188,440 | 6/1965 | Wokas | 219/10.79 |
| 3,525,842 | 8/1970 | Steinhoff et al. | 219/10.79 |
| 3,641,281 | 2/1972 | Varadi | 179/100.2 C |
| 3,659,069 | 4/1972 | Balzen et al. | 219/10.79 |
| 3,754,109 | 8/1973 | Moulin et al. | 219/9.5 |
| 3,836,744 | 9/1974 | Taketo et al. | 219/10.49 |
| 3,883,712 | 5/1975 | McBriarty | 219/10.53 |
| 4,054,770 | 10/1977 | Jackson et al. | 219/10.79 |

*Primary Examiner*—Bruce A. Reynolds
*Attorney, Agent, or Firm*—Thomas W. Buckman; Robert W. Beart

[57] ABSTRACT

An induction heating system for heating an adhesive coated metal article of an irregular shape including a U-shaped core associated with the metal article so that the article completes a magnetic flux circuit. The end faces of the core and the surface of the metal article being spaced a nonuniform distance by protuberances of unequal distance between the end faces and the article.

4 Claims, 6 Drawing Figures

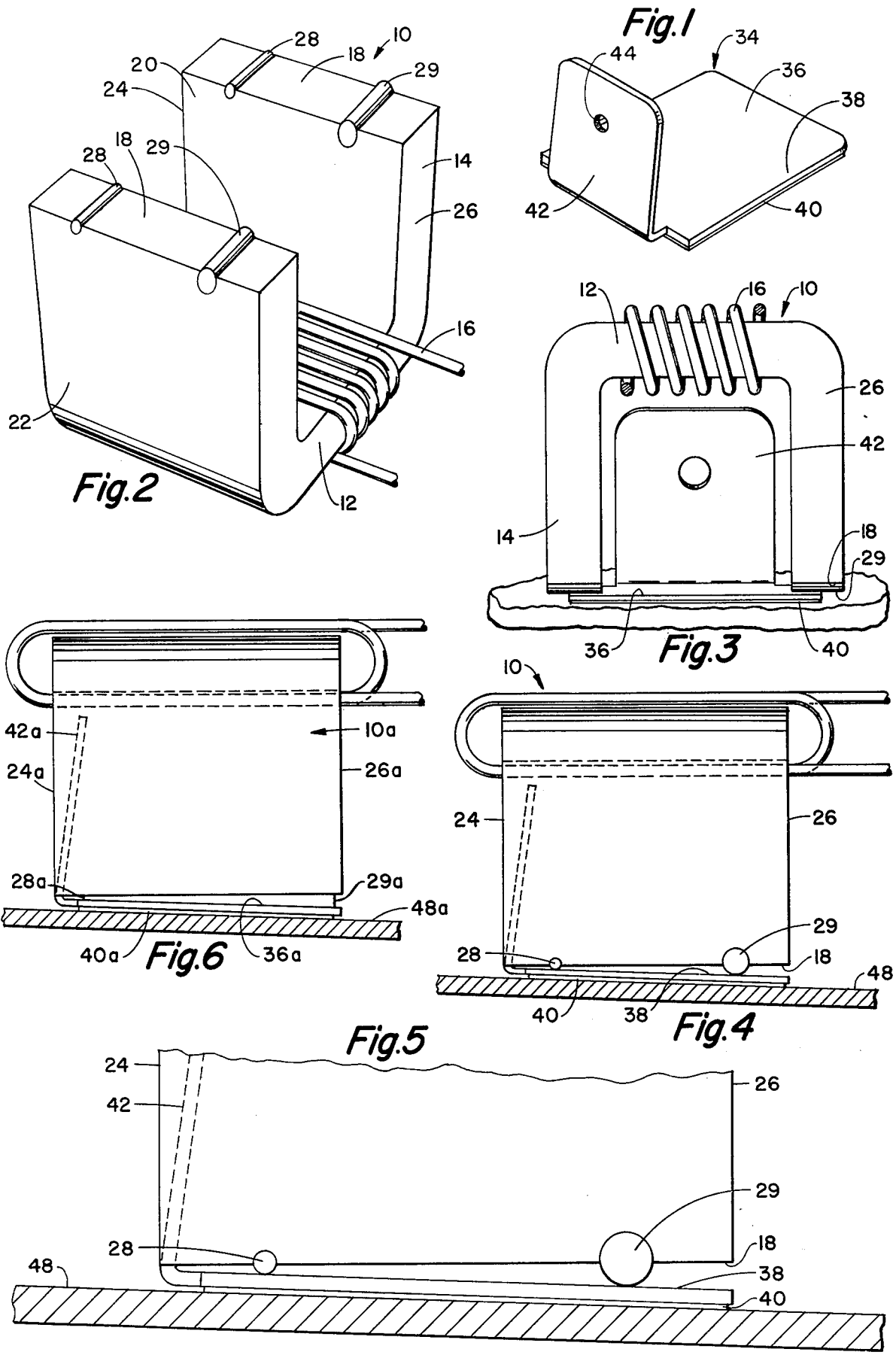

INDUCTION HEATING CORE AND HEATING SYSTEM FOR ADHESIVE FASTENERS

The subject matter of the instant application is related to that of copending application Ser. No. 837,064, filed of even date herewith and common assignee.

The present invention relates generally to a core for use in an induction heating system.

The invention more particularly relates to a heating system using a unique core to heat irregularly shaped adhesive carrying fasteners.

A prior art technique of applying discrete fastener members to a support structure includes the use of a U-shaped induction core positioned in abutting relationship to a fastener member with the adhesive layer positioned beneath the surface of the fastener and into contact with the support structure. Activation of current in an exciter coil wound about the core completes a magnetic flux path through the metal article generating heat in the article to activate the adhesive.

Fasteners secured to a support structure with an adhesive layer such as that described above should be heated uniformly or the strength of the bond will differ substantially from one extremity of the fastener to the other. The adhesive coated fasteners may be of a variety of sizes, including those where a nonadhesive carrying feature is adjacent one extremity. Such an irregularly configured fastener creates an undesirable problem because the nonadhesive carrying feature acts as a heat sink and thus draws the heat from the adhesive carrying structure into the nonadhesive carrying structure. This results in a nonuniform heating pattern for the adhesive layer.

It is therefore a primary object of this invention to provide a heating system which permits an irregularly shaped metal article to be heated so that the adhesive layer is heated in a uniform manner.

A further object of the invention is to provide a particularly configured U-shaped induction heating core which will uniformly heat an adhesive layer on an irregularly shaped article.

A particular advantage of the present invention is the provision of spacing means in a core which insures that an adhesive layer on an irregularly configured metal article is heated uniformly and also prevents heat loss from the article back into the core.

These and other objects and advantages are obtained by the present invention which in its preferred embodiment incorporates a plurality of rod-like protuberances in the end surfaces of a U-shaped core. Each end surface includes at least two such rod-like elements with a rod-like element in one extremity of an end surface extending a greater distance from the end surface than the rod-like element in the other extremity of the end surface. The association of a core of the type just described with an irregular metal article, such as an L-shaped fastener, creates a heating system which will produce a uniform heating pattern in the adhesive layer. In this system the end faces of the core legs are spaced a greater distance from the base of the fastener in a region remote from the upstanding tab than the region approximate the upstanding tab. Thus, a greater flux density will be created in the region of the tab to accommodate the heat losses into the tab and therefore insure a uniform heating of the adhesive layer in spite of the inherent heat sink. An alternate embodiment of the invention considers the formation of a wedge-shaped insulative coating on the end faces so that the end faces are spaced a greater distance from the article in a region remote from the nonadhesive carrying tab than the region closely adjacent the adhesive carrying tab.

Accordingly, many other objects, features and advantages of this invention will become more fully realized and understood from the following detailed description when taken in conjunction with the accompanying drawings wherein like reference numerals throughout the various views of the drawings are intended to designate similar elements or components.

BRIEF DESCRIPTION OF THE DRAWINGS

FIG. 1 is a perspective view of an irregularly shaped adhesive fastener typical of the type which may be secured using this invention.

FIG. 2 is a perspective view of a U-shaped induction core in accordance with the invention.

FIG. 3 is a rear end elevational view of the core used in association with the metal article of FIG. 1.

FIG. 4 is a side elevational view of the invention shown in FIG. 3.

FIG. 5 is an enlarged partial side elevational view of the invention of FIG. 4 showing the relationship of the end face of the core to the metal article.

FIG. 6 is a side elevational view of an alternate embodiment of the invention.

DETAILED DESCRIPTION OF THE PREFERRED EMBODIMENT

Referring now to the drawings, reference numeral 10 denotes a U-shaped magnetizable core member which basically includes a bridge section 12 interconnecting a pair of legs 14 with an exciter core 16 wound about the bridge. End surfaces 18 of the legs are adapted to be placed in abutting relationship on an adhesive carrying metal article.

FIG. 1 shows an adhesive carrying metal article 34 which is effectively secured to a supporting work structure through the use of the invention. It will be noted that the metal article includes a substantially flat base 36 with an undersurface coated with a layer of heat activable adhesive 40. One end extremity of the generally rectangular base includes a tab-like extension 42 extending upwardly and may be provided with an aperture 44 to accept a secondary attachment once the article 34 is adhesively secured to a primary surface 48.

In use, a U-shaped core of the type generally described herein is associated with the base 36 of the fastener with the end surfaces 18 of the core juxtaposed over spaced upper surface regions 38 and forming juncture regions in a completed magnetic flux circuit. As the flux flows through the base 36, heat is generated by the creation of eddy currents and through the hysteresis effect. It will be noted, however, that an upstanding tab 42 will act as a heat sink, drawing effective heat from the region of the base adjacent the tab. Thus, the tab influences the development of a nonuniform heating pattern for the adhesive layer. The present invention compensates for such an undesirable situation.

In the preferred embodiment of a core 10, a plurality of protuberances are embedded in each end surface 18. These protuberances, in each of the end surfaces 18, are shown to include a first element 28 adjacent a rear face 24 of the core, protruding a given distance from the end surface 18, and a second element 29 adjacent a front face 26 protruding a second and greater distance from the end face.

In use, the core 10 is associated with an irregular shaped item, such as article 34, so that the protuberance 28 is adjacent the tab 42 while the protuberance 29 is positioned remote from the tab 42. Since the flux density created in an article to be heated using a heating system of this type depends greatly upon the distance that the core is spaced above the surface to be heated, it will be apparent that the flux density in the region adjacent the tab 42 will be greater than the density in the region remote from such a tab. Thus, a greater amount of heat is provided the base 36 in the region of the tab to accommodate and compensate for the heat that is conducted into the heat sink tab 42.

A carefully controlled use of nonconductive protuberances 28 and 29 will thus create a substantially uniform heating pattern for the adhesive layer 40. It should be noted that while the rods 28 and 29 are shown to be of different diameters, the same result can be accomplished by using a rod of identical diameters and imbedding one rod in the end face a greater distance than the imbedment of the other. It becomes important that the rod be of nonconducting, wear-resistant material, such as ceramic, aluminum oxide or the like, in order to prevent conduction back into the core element itself, which would create heat loss from the side edge margins of the fastener device into the core element.

While a preferred embodiment shows the use of rods which provide a limited surface contact between the core and the article, it should be apparent that the tilting of the end faces of the core can be accomplished in an alternate manner. For example, in FIG. 6 a core 10a substantially identical to 10 includes all of the features of the primary embodiment with like reference numerals including the suffix "a" designating similar elements with the exception of the type of spacing means shown on the end surface 18a. In the alternate embodiment, a wedge-shaped coating of nonconductive material is formed on the end surfaces of the core. The extremity 28a of the coating is of a given thickness which is less than the thickness of the extremity 29a, thus providing a difference in flux density substantially identical to that of the preferred embodiment.

It should be apparent that the basic principles of this invention can be utilized with any number of actual configurations of adhesive bearing fastener members which would inherently create a non-uniform heating pattern to the adhesive layer because of a heat sink created by a nonadhesive carrying portion of the fastener. Since adhesive bonds are weakest when subjected to a peel force, efforts should be taken to strengthen the bond adjacent the perimeter of an adhesive layer, particularly when a secondary fastening means, such as a tab, is designed to accept a load and transfer that load to the bond line. The broad scope of this invention solves such a problem. It is intended that the broad scope of the invention cover all such alternatives of fasteners and it should be understood that it is not intended to limit the invention to the embodiment shown. On the contrary, it is intended to cover all alternatives, modifications and equivalents as may be included within the spirit and scope of the invention as defined by the appended claims.

I claim:

1. An induction heating system comprising in combination, an irregular shaped, discrete metal article, a support surface upon which said article is to be accurately secured, a pressure applicating core structure for use in efficiently heating, by induction, said irregular shaped discrete metal article, said article including a primary attachment section carrying a layer of activable adhesive there beneath and a second nonadhesive carrying secondary attachment section extending generally upwardly from adjacent a perimeter region of said first section the core structure comprising a U-shaped core with end surfaces at the extremities of each leg adapted to be associated with laterally spaced side marginal upper surface regions of said adhesive carrying section so that the adhesive carrying section completes a closed magnetic flux circuit beneath the core, the legs defining front and rear surfaces in planes generally parallel to the plane of the bight portion of the U-shaped core, the flat end surfaces of each leg being coplanar and intersecting the planes of the front and rear leg surfaces, said end surfaces of the core carrying nonconductive means to abut said spaced surface regions of the metal article and nonconductively position the end surfaces in spaced juxtaposed relationship to the associated spaced surface regions with the extremity of said end surfaces located adjacent the nonadhesive carrying section being spaced from the metal article a distance less than the distance of spacing between the other extremity of the end surfaces from its associated upper surface regions on the adhesive carrying section, to tilt the flat end surfaces of the legs out of coplanar relationship with the upper surface regions of the adhesive carrying section of the metal article, the spacing means thereby compensating for the heat dissipated into the nonadhesive carrying section so that the adhesive layer will be uniformly heated between the discrete metal article and support surface.

2. The core structure of claim 1, wherein the nonconductive means comprises a coating on the end surface of each leg of increasing thickness from a front surface of the core to a rear surface of the core with the exposed end surfaces of the thus formed composite core structure being coplanar.

3. The core structure of claim 1, wherein the nonconductive means comprises a plurality of spaced protuberances embedded in each end surface, one protuberance in one end surface extending a smaller distance from the end surface than another protuberance in said one end surface.

4. The core structure of claim 3, wherein the spaced protuberances are rib-like members each extending in a direction from an inner side surface to an outer side surface of a leg.

* * * * *